Figure 14:
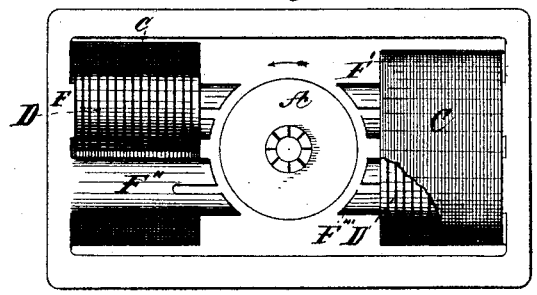

(No Model.) 2 Sheets—Sheet 1.
E. THOMSON.
DYNAMO ELECTRIC MACHINE AND MOTOR.
No. 459,422. Patented Sept. 15, 1891.
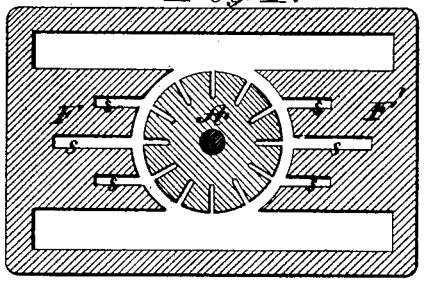
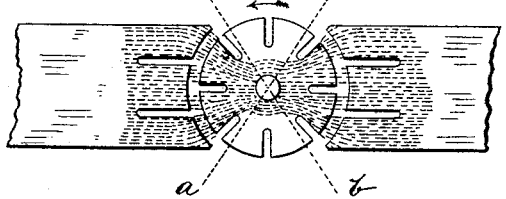
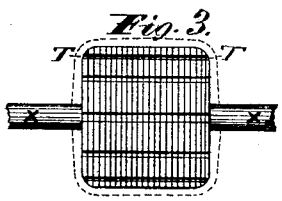
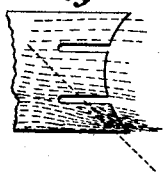
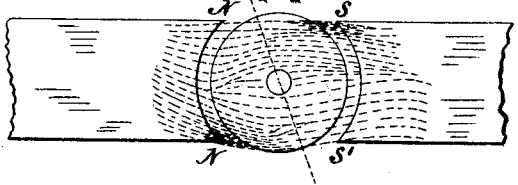
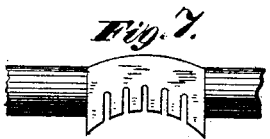
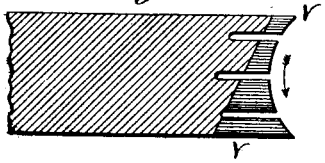
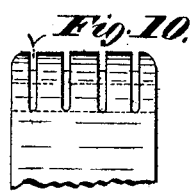
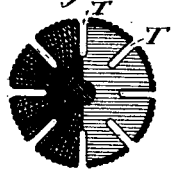
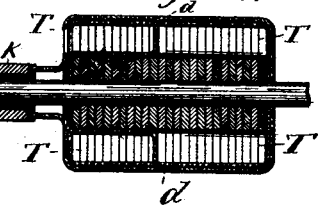
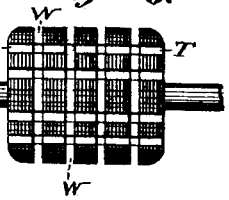
WITNESSES:
INVENTOR
E. Thomson
BY
H. L. Townsend
ATTORNEY (No Model.) 2 Sheets—Sheet 2.

E. THOMSON.
DYNAMO ELECTRIC MACHINE AND MOTOR.

No. 459,422. Patented Sept. 15, 1891.

WITNESSES:

INVENTOR
E. Thomson
BY
H. C. Townsend
ATTORNEY

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

DYNAMO-ELECTRIC MACHINE AND MOTOR.

SPECIFICATION forming part of Letters Patent No. 459,422, dated September 15, 1891.

Application filed October 31, 1885. Serial No. 181,436. (No model.)

*To all whom it may concern:*

Be it known that I, ELIHU THOMSON, a citizen of the United States, and a resident of Lynn, in the county of Essex and State of Massachusetts, have invented certain new and useful Dynamo-Electric Machines and Motors, of which the following is a specification.

The present invention relates to a construction of field-magnet and armature cores for dynamo-electric machines or motors; and the object of the invention is to secure the advantage of directing the magnetism through the field-core or through both together in such a way that the lines of magnetic force shall pass in a direction more nearly diametrically across the armature and be less subject to diversion from this course by the circulation of currents in the wire around the armature-core than has hitherto been the case in such machinery.

It is a well-known fact that during the action of the dynamo-electric machine the armature of which is developing very powerful currents of electricity a displacement of the magnetism of the magnetic field may take place, due to the resultant effect of the coils in the armature acting upon the lines of force in the magnetic field, and tending thereby to disturb their direction. To overcome this, resort has been sometimes had to the expedient of giving very great strength to the magnetic field itself, so as to overcome the tendency of the armature-coils to displace or distort the magnetic field of the machine. In my invention, however, the object to be attained is accomplished by giving certain forms to the field-magnet cores or to the armature-cores, or to both, as may be desired.

The result of the employment of my improvement is the obtainment of a more-prolonged condition of neutrality in the armature-coils when they are passing the neutral point, which is evidently of great advantage in preventing short-circuiting of coils at the neutral point when the armature is wound in a system analogous to that of the Gramme or Siemens machine, where the conductor is coiled as a continuous wire; but I by no means limit my present invention to machines in which such winding is employed, as it is useful in other systems of winding, as will be evident from the description of its functions and effects.

I proceed to the description of the invention by reference to the accompanying drawings, in which—

Figure 15:
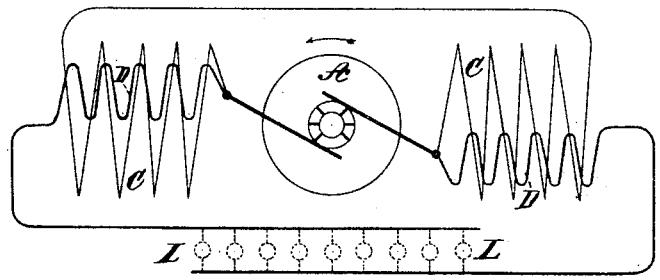
Figure 16:
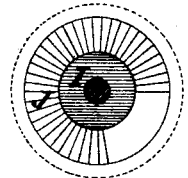
Figure 17:
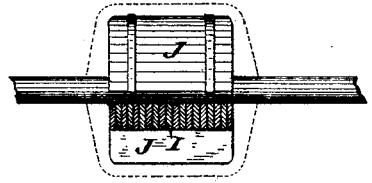
Figure 18:
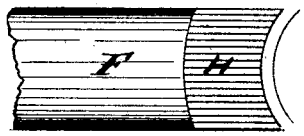
Figure 19:

Figure 1 is a section of the iron-work of a machine embodying my invention. Fig. 2 is an end view of the field-magnet pole; Fig. 3, a plan view of the armature-core. Figs. 4, 5, and 6 are diagrams illustrating the distribution of the magnetism. Figs. 7, 8, 9, and 10 illustrate modifications of the field-magnet pole. Figs. 11 and 12 show the preferred form of arranging the wire winding of the armature. Fig. 13 shows a modified arrangement of the armature-core. Fig. 14 illustrates one of the preferred modes of winding the field-magnets constructed in accordance with my present invention. Fig. 15 is a diagram of the winding used in Fig. 14. Figs. 16 and 17 illustrate a further modification of the armature-core constructed in accordance with my invention. Figs. 18 and 19 show modified constructions of field-magnet pole.

In Fig. 1, F F' represent in section field-magnets the curved faces of which are presented to the armature A, mounted to revolve between them, space being allowed for the winding of the armature-core, as usual. The field-magnets are constructed in any desired way; but the portions which are presented to the armature are slotted, as shown in the figure S S S S S S, three slots being shown in each pole. More or less, however, may be used. The slots run substantially in a direction nearly parallel to the direction of the armature-shaft, and are therefore transverse to the armature and in the present form of machine to the plane of rotation of the armature.

The armature-core is constructed, preferably, of a number of sheets or disks of iron, made of thin metal, strung upon the shaft, or in some cases separated a short distance from the shaft, but supported thereby. In the circumference of the armature-core are a series of deep but narrow notches extending in a direction parallel to the axis of the armature and therefore running in a direction nearly parallel to the slots in the field-poles. In Figs. 2 and 3 the direction of these slots is more distinctly seen, one of them in Fig. 2, which is a front view of the face of the field-magnet presented to the armature, being marked S S, and one of them in Fig. 3, which is a side view of the armature-core, being marked T T, said armature-core being mounted on a shaft in suitable bearings, so that it may be revolved, as usual. This armature is wound with wire according to any approved system, and the limits of winding are indicated in dotted lines in Fig. 3.

Figs. 4 and 5 are diagrammatic views of the distribution of the magnetism in a machine with my improved arrangement, and in the ordinary machines, respectively, when the machine is in operation.

It will be seen that in Fig. 4 the slots in the armature serve to prevent the passage of the magnetism across the core, except substantially through its central portions, where the line of iron is the shortest. This is due to the fact that the slots existing in the armature-core prevent the passage of the magnetic effect above and below; or, in other words, little or no magnetism passes into the armature-core where those portions lying between the dotted lines $a\ a\ b\ b$ exist, and hence if a coil of wire surrounding the armature-core in a plane parallel to the axis of the same should be moved from a position indicated in the dotted lines $a\ a$ so as to occupy a position indicated by the dotted lines $b\ b$ the amount of magnetism or the number of the lines of force passing through its center would remain practically unchanged during its change of position. In accordance with modern theory, therefore, no currents or electro-motive-force tendency would be set up in such coil during its passage, and hence the coil would be nearly neutral for a considerable period during revolution. This is not the case, however, in the ordinary construction, where the armature-core is without longitudinal slots running part way through its section. In this case there is nothing to prevent the passage of the magnetism in a distorted way through the armature-core, and from the fact that the amount of magnetic lines of force inclosed in a coil does not remain the same for any considerable period during revolution the neutral region or position at which the coil does not tend to develop current is extremely sharp and well defined.

Fig. 5 shows the imperfectly well-known and accepted distortion and arrangement of magnetism in the ordinary devices. It will be seen that this distortion during the revolution of the armature is shared by the field-magnet itself having its poles strengthened where the armature leaves, as at N S, and weakened where the armature approaches the field, as at N' S'. To overcome this tendency to shifting of the magnetism, I have slotted the poles of the field-magnets in lines transverse to the armature-body or parallel to the active wire moving past the poles, as in Fig. 4, thereby forming virtually several field-poles and preventing in a large measure a lateral distortion of magnetism by cutting off or removing any free circuit which would enable the magnetic effects to pass diagonally across the field-core in a direction such as might be indicated by the dotted lines in Fig. 6, since to obtain the strong poles existing at N S, Fig. 5, it is necessary that the distribution of the magnetism in the body of the field-magnet be more or less inclined to its axis. In my invention, however, the paths or directions which the magnetism can take in the axis of the field are more or less restricted, and any tendency to its diagonal development is checked by the air in the slots not permitting free passage of such lines. In Fig. 7 the same slotting is shown applied to one of the ordinary forms of field-magnet pole-piece.

Figs. 8, 9, and 10 represent my slotted field-pole provided with other slots extending in a direction with the circumference of the armature and indicated between the letters V V, Fig. 8 being a side view in section through one of the slots V V, Fig. 9 a front or face view of the pole, and Fig. 10 a bottom view showing the slots running transversely to the former slots extending parallel to the axis of the armature. The object of this arrangement is to still further divide up the field-face into a number of separate polar surfaces and to secure besides the advantage I have mentioned a space through which air may circulate for the cooling of the armature and field poles.

In Fig. 11 the preferred mode of laying on the wire of the armature is shown, although I do not limit myself in this respect. The coils of insulated copper wire are laid over the armature in such a way as to leave the slots T T, &c., open, thereby assisting in the ventilation of the armature. In other cases the slots may be filled or covered with non-magnetic material and the coils wound completely over the face of the armature. The construction in Fig. 11 is to be preferred, for the reason that increased surface for the cooling of the armature is thereby provided, and the coils are placed in a good position to present themselves to the air during revolution and to occupy a very effective position in passing through the field.

The armature-winding is, as said before, any preferred system in which the coils are more or less wound in planes nearly parallel to the shaft on which the armature revolves. I find that the slots T T in the armature-core are useful in another way, and this is indicated in Fig. 12. They may serve the purpose of apertures in the armature-core for the outward passage of connecting-wires to the commutator K from the armature-coils wound around said core, connection to the armature-coils being made at any convenient point, as at $d\ d$. In this case the armature may have as many slots as wires necessary to be carried, or two or more wires may be carried in one slot, if desired.

In Figs. 3 and 12 the armature-core is shown as built up of a number of sheets of metal placed side by side; but it is sometimes preferable to place these sheets in separate groups, as shown in Fig. 13, thereby providing spaces or slots extending circumferentially around the armature-core, and indicated at W W, in addition to the slots or spaces extending longitudinally through the material of the armature-core.

It is to be understood that for the purpose fulfilled by the slots T T it is necessary that a number of them should exist, so as to break the magnetic continuity around the circumference of the armature at a number of separate places, so that at any one time there shall be at least one or more of them occupying a position nearly transverse to a line joining the centers of the field-magnet poles, so as to interrupt the passage of magnetism, except through the central portions of the magnetic material of the armature-core. At the same time the slots T T must have sufficient width to fulfill this function unequivocally. Excessive width will merely weaken the machine somewhat, while if made extremely narrow they will only partially perform the desired functions.

By the arrangement in Fig. 13 with the two sets of spaces a more effective ventilation and division of the armature-core are obtained.

In Fig. 14 a preferred mode of combining the field-magnets in the case where the machine is to be compounded or wound for regulation is shown. This part of my invention consists in an improved method of regulating the action of a dynamo-machine or motor, consisting in differentiating the effects of two separate field-magnet-pole pieces divided from one another and lying at different distances from the brush or diameter of commutation proceeding in the direction of rotation. In this part of the invention I have a twofold object in view: first, to prevent any change in the line or diameter of commutation with an increase of load, and, secondly, to obtain an automatic regulation of the machine in accordance with changes of the load.

I have herein shown my invention as applied to a dynamo-electric machine compounded or wound with a coil traversed by the main current, which varies with the load, and with a coil in a shunt-circuit around the work or one which carries a current practically constant. Each field-pole is divided so that a coil may be wound upon a portion of it which is nearest the side toward which the armature is moving, or which occupies a position on the field-core toward which the armature is advancing, or, in other words, that portion lying next the brush or line of commutation proceeding in the direction of rotation during revolution. In Fig. 14 these poles are F F''' and the direction of revolution is as shown by the arrow. I wind in this case the main-circuit wire of the machine, or at least a considerable portion of it, upon those portions of the field-poles toward which the armature is advancing, leaving those F' F'' not so wound, or at least wound with much less of the main circuit. The whole field-magnet, however, F F$^2$ and F' F''', is subsequently wound with finer or derived-circuit wire, (indicated at C C.)

The diagram of the circuits is given in Fig. 15, the coils occupying their relative positions, the direct field-coils being indicated by the lines D D and the derived field-coils surrounding them by the lines C C. The portions of the field-magnet core, however, have been omitted for clearness. As will be seen, the coils C C and D are wound in the field-magnet not concentrically, but have different centers or axes. The circuit is supposed to be used in feeding lights or other devices arranged in multiple arc.

The object of the disposition of the circuits and position of the coils shown in Figs. 14 and 15 is as follows: When the machine is developing little or no current in the armature, the direction and arrangement of the field are nearly undisturbed in its passage through the armature-core during revolution of the same; but if now the demand upon the armature is greatly increased, so that its coils are developing and conveying very large currents, the effect upon the distribution of the magnectic field as induced by the field-magnets is in ordinary cases very pronounced, resulting in the distortion and displacement of the field, which it is the object of the former parts of my invention to avoid or obviate in a great measure. However, this end can be more perfectly attained if those portions of the field-magnet toward which the armature is moving and which are the portions that are most liable to have their magnetic effects disturbed and forced aside by the armature-currents be correspondingly strengthened in their effect upon the armature-core, thereby producing a counter-distortion in the magnetic field, which practically balances the effects of the armature-currents and gives a nearly fixed neutral position for the armature-coils, so that during working under extreme or light load little or no adjustment is needed to be made at the commutator—that is, the segments of the commutator will have a fairly constant neutral position. Now as the coils D D are in the main circuit of the machine, and subject, therefore, to every change in its load, it will be evident that any increase of the armature-currents will increase the magnetic force of the coils D D and will strengthen those portions of the field-poles F F''' directly in proportion to the increase of the effect of the armature-coils themselves in disturbing the magnetic field. This strengthening of the portions of the poles toward which the armature is moving after having left the field-poles of opposite polarity will then prevent the shifting forward of the neutral point in the armature under any increase of load, so that the commutator-brushes may be practically set in a constant position at the same time that the proportions of the main coils D D and derived-circuit coils C C may be selected, so as to give a compound-wound constant-potential machine.

In Figs. 16 and 17 the armature-core, instead of being slotted by the longitudinal slots T T, as in former figures, is built up of a number of small disks of iron I, strung upon or supported upon the shaft, and around which are suitably supported by bands or other means a number of flat pieces of sheet-iron arranged edgewise radially from the central disks I and running along the outside of the armature in a direction (shown in Fig. 17) fairly parallel to the axis. This outer radial covering of iron is indicated by radial lines J in Fig. 16. The effects are similar to those obtained in the use of the armature with slots, since the pieces J, laid edgewise and radially in planes nearly coincident with the axis, from their large number serve, though lying closely together, the purpose of stopping off magnetic transfer, except through the central portions I of the armature, (when revolved between the faces of the field-magnets.)

The dotted lines indicate the exterior winding of wire.

In Figs. 18 and 19 a similar modification of the field-magnets is indicated. The polar faces of the magnets are constructed by piling strips of iron with their planes parallel to the axis of the armature and presenting their edges toward the armature during revolution. These pieces of iron are indicated at H in both figures. This is a useful construction of field-magnet pole for preventing distortion of the field, and also preventing the circulation of induced currents in the mass of the field-pole when the armature revolved before such pole is of such nature as to set up such currents, as in the case where it is constructed of iron masses running close to the field-pole itself.

What I claim as my invention is—

1. In a dynamo-electric machine, the combination, with armature-coils applied to the periphery of the carrier, of an armature-core provided with narrow slots lying beneath the inner side of the coil and extending longitudinally or parallel to the axis of said core and radially toward the center of said armature-core, such slots passing only part way through the iron of said core, leaving that portion of the iron close to the shaft continuous and unslotted.

2. In a dynamo-electric machine, a cylindrical armature-carrier built up of a number of deeply-notched disks of iron strung upon an armature-shaft, in combination with a coil wound longitudinally over said carrier, substantially as described.

3. In a dynamo-electric machine, an armature built up of disks of iron, whose exterior surface has narrow notches running longitudinally parallel to the armature-shaft and part way down into said armature-core, and also notches, grooves, or spaces extending circumferentially around the armature-core and part way or nearly down to the shaft, in combination with a coil or coils wound longitudinally over the periphery of said armature.

4. In a dynamo-electric machine, a field-magnet pole-piece having transverse notches or grooves, one set running transverse and the other parallel to the direction of rotation.

5. In a dynamo-electric machine, a slotted or divided armature wound with wire passing over the open ends of the slots and applied only upon those portions of iron extending outwardly, leaving open grooves or divisions between the coils extending part way through the armature-core.

6. In a dynamo-electric machine, the combination of the slotted armature with the leading-wires embedded therein.

7. In a dynamo-electric machine or motor, a field-magnet pole-piece subdivided in planes transverse to the lines in which the magnetic lines of distortion tend to run, as and for the purpose described.

8. In a dynamo-electric machine or motor, an armature-core subdivided in lines parallel and transverse to the direction of the armature-wire, which is carried longitudinally over the periphery of the armature-core.

9. In a dynamo-electric machine or motor, an armature-core subdivided in planes extending parallel to the active wires of the armature and radially inward below the armature-coils, as and for the purpose described.

10. In a dynamo-electric machine or motor, a field-magnet core wound with different sets of coils whose axes are displaced instead of being coincident.

11. In a dynamo-electric machine or motor, the combination, with a field-magnet core, of two sets of energizing-coils having different positions (axially) and connected one to the circuit containing the work and the other into a derived circuit.

12. The herein-described method of regulating the action of a dynamo machine or motor, consisting in differentiating the effects of two field-magnet pole-pieces divided from one another and lying at different distances from the brush or line of commutation proceeding in the direction of rotation.

13. The herein-described method of preventing change in the position of the diameter of commutation in a dynamo-electric machine on an increase of the main-circuit current, consisting in increasing the magnetic effect of a separate or divided part of the field-pole lying next the brushes or line of commutation proceeding in the direction of rotation.

14. The herein-described method of counteracting the tendency to change in the position of the diameter of commutation in a dynamo-machine with a change of load, consisting in locally strengthening the part of the field lying next the brush in the direction of rotation on an increase of load and maintaining the portion of the field-pole the farther removed in the direction of rotation at a substantially constant strength.

15. The herein-described method of regulating the action of a dynamo-electric machine, consisting in subjecting the armature to the action of a divided field-pole, the two parts of which lie at different points in the direction of rotation around the armature, maintaining a substantially constant effect in one field-magnet pole and varying the magnetism of the other divided portion with the change of load.

16. The herein-described method of regulating the action of a dynamo-electric machine and maintaining the position of the neutral line or line of commutation, consisting in subjecting the armature to the action of a divided field-magnet pole, the line of division of which is transverse to the line of rotation, and varying the magnetic strength of the division of the pole lying next the brush or line of commutation proceeding in the direction of rotation.

17. In a dynamo-electric machine or motor, a field-magnet pole-piece subdivided in planes transverse to the plane of rotation, in combination with independent magnetizing-helices, one of which, acting upon the portion of pole next the diameter of commutation proceeding in the direction of rotation, is included in the main circuit.

18. In a dynamo-electric machine, a field-magnet wound with a derived-circuit coil, in combination with a main-circuit coil surrounding a core which lies nearer the brushes in the direction of the armature's rotation than does the portion of core surrounded by the said derived-circuit coil, said main-circuit coil being wound or applied to produce the same polarity on the same side of the diameter of commutation, as and for the purpose described.

19. In a dynamo-electric machine or motor, a divided field-pole provided with a coil for locally strengthening that part of the pole which is next to the line of commutation proceeding in the direction of rotation.

20. In a dynamo-electric machine or motor, a field-magnet pole having its part liable to weakening by the action of the armature divided or separated from the part which is on the same side of the diameter of commutation, but is farther advanced in the direction of rotation, said part liable to weakening being provided with a supplemental strengthening-coil, as and for the purpose described.

21. In a dynamo-electric machine, the combination, with two separate portions of pole-piece of the same polarity or lying on the same side of the diameter of commutation, of a supplemental strengthening-coil applied to the divided or separate portion which is next a brush in the direction of rotation, as and for the purpose described.

22. The combination, in a dynamo-electric machine, of a shunt field-coil carrying a practically-constant current and a main-circuit field-coil carrying a variable current and applied to a separate or divided portion of the field-magnet pole which acts upon a different portion of the armature proceeding in the direction of rotation from that which is affected by the said derived-circuit coil.

23. The herein-described method of counteracting the tendency to change in the direction of the diameter of commutation in a dynamo machine or motor upon a change of load, consisting in locally varying the strength of a divided or separate portion of the pole-piece with relation to another portion of the poles or pole-pieces of the same polarity and lying on the same side of the diameter of commutation.

24. In a dynamo-electric machine, the combination of a main-field-magnet pole and an independently-variable divided or separate pole acting at the part of the magnetic field liable to weakening or distortion by the armature and having coils in circuit with the armature.

25. In a dynamo-electric machine, the combination, with an armature, of a main field-magnet, an extra coil in series with the armature and applied to a separate or divided portion of pole which acts at the part of the magnetic field liable to weakening by the armature magnetism.

Signed at Lynn, in the county of Essex and State of Massachusetts, this 27th day of October, A. D. 1885.

ELIHU THOMSON.

Witnesses:
MARY L. THOMSON,
GEORGE J. CARR.